United States Patent

Mathis

[15] 3,653,825

[45] Apr. 4, 1972

[54] PROCESS FOR THE MANUFACTURE OF BORIC ACID

[72] Inventor: Pierre Mathis, Dombasle-sur-Meurthe, France

[73] Assignee: Solvay & Cie, Brussels, Belgium

[22] Filed: Apr. 30, 1970

[21] Appl. No.: 33,291

[30] Foreign Application Priority Data

Apr. 30, 1969 France..................................6913966

[52] U.S. Cl..................................................23/149, 23/59
[51] Int. Cl. ......................................................C01b 35/00
[58] Field of Search..............................................23/59, 149

[56] References Cited

UNITED STATES PATENTS

| | | | |
|---|---|---|---|
| 725,786 | 4/1903 | Smethurst............................23/59 X |
| 3,031,264 | 4/1962 | Nies..........................................23/149 |
| 2,130,065 | 9/1938 | Burke et al.............................23/59 X |
| 1,108,129 | 8/1914 | Burger....................................23/149 |
| 1,468,366 | 9/1923 | Kelly..........................................23/59 |

*Primary Examiner*—Herbert T. Carter
*Attorney*—Robert E. Burns and Emmanuel J. Lobato

[57] ABSTRACT

Boric acid is produced by treating a mixture of water and crude or calcined borocalcic ore with $CO_2$, the partial pressure of which is at least 1 bar, at a temperature above 80° C. and then separating the liquid phase from the solid phase under a pressure and temperature at least equal to those under which treatment with $CO_2$ was carried out. The pressure and temperature of the liquid phase are then decreased and the boric acid is crystallized from the liquid phase.

8 Claims, 4 Drawing Figures

PROCESS FOR THE MANUFACTURE OF BORIC ACID

BACKGROUND OF THE INVENTION

The present invention concerns improvements in the process of manufacturing boric acid by treating borocalcic ores with carbon dioxide.

It is well known that boric acid can be recovered by crystallization from aqueous solutions which are prepared by treating borocalcic ores such as colemanite with $CO_2$ in the presence of water. Most often, however, rather dilute aqueous solutions are obtained and a concentration treatment must be carried out before separating boric acid by crystallization. One means to increase the concentration of $B_2O_3$ in aqueous solutions obtained by this process involves a prior calcination of the ore as disclosed in U.S. Pat. No. 1,108,129 granted to A. Burger. One disadvantage of this process is that solutions are obtained which have a high content of dissolved CaO, i.e., from 5 to 10 g./kg., when the calcination is carried out at the recommended temperatures.

In order to obtain boric acid of sufficient purity, the solution must not contain too much dissolved CaO, otherwise other materials and particularly calcium borates coprecipitate during the crystallization of boric acid.

It has been proposed in U.S. Pat. No. 1,108,129 to neutralize the solution of $B_2O_3$ by adding a mineral acid before crystallizing the boric acid; however, if hydrochloric acid is used, the calcium is converted into $CaCl_2$ which is soluble. Then, to eliminate $CaCl_2$, the mother liquors from the crystallization are simply discharged periodically. The calcium may also be eliminated by fixation on an adequate ion-exchange resin. This process has the advantage of not requiring the discharge of the mother liquors of crystallization.

When sulfuric acid is used, calcium sulfate can be precipitated and separated by decanting and filtering. But, in this case, crusting of the evaporators by $CaSO_4.2H_2O$ takes place. Furthermore, part of the calcium remains dissolved and is coprecipitated afterwards with boric acid under the usual conditions. The resultant boric acid then contains much more calcium than the usual commercial product. In order to decrease the final content of dissolved CaO, the ore can be treated with silica in the presence of $CO_2$, as is recommended in British Pat. No. 863,541 granted to U.S. Borax and Chemical Corp. Under these conditions, calcium silicate is obtained as a by-product.

All of these processes indicate the necessity for decreasing the content of dissolved CaO in boric acid before crystallization takes place and each of these processes requires the use of a supplemental acid reactant and an increase in the number of treatments, which affects the economics of the process.

SUMMARY OF THE INVENTION

A new method has been discovered for treating borocalcic ores whereby solutions which are richer in dissolved $B_2O_3$ and which moreover contain less CaO are obtained.

According to the invention boric acid is manufactured by crystallization from aqueous solutions obtained by treating a borocalcic ore with carbon dioxide in the presence of water by a method which comprises:

agitating an aqueous dispersion of finely ground ore, crude or previously calcinated in at least one autoclave under a partial pressure of $CO_2$ of at least 1 bar at a temperature superior to 80° C., separating the resultant solid phase from said liquid phase under conditions of temperature and pressure at least equal to those of the treatment of ore with $CO_2$, then decreasing the pressure, discharging the liquid phase and crystallizing the boric acid from the liquid phase.

DESCRIPTION OF THE INVENTION

Surprisingly, it has been found that in the present process the amount of $B_2O_3$ dissolved in the liquid phase increases as the temperature at which the treatment with $CO_2$ is carried out is raised, although the solubility of $CO_2$ decreases with rising temperatures.

Thus, by treating an excess of crude colemanite in an aqueous suspension under a constant partial pressure of $CO_2$ equal to 7.3 bars, the concentrations of dissolved $B_2O_3$ obtained with varying temperatures of treatment are shown in Table 1.

TABLE 1

| Temperatures °C. | 70 | 90 | 120 | 140 | 170 |
|---|---|---|---|---|---|
| Concentrations of $B_2O_3$ in the final solution g./kg. | 55 | 65 | 74 | 85 | 91 |

Figure 1:
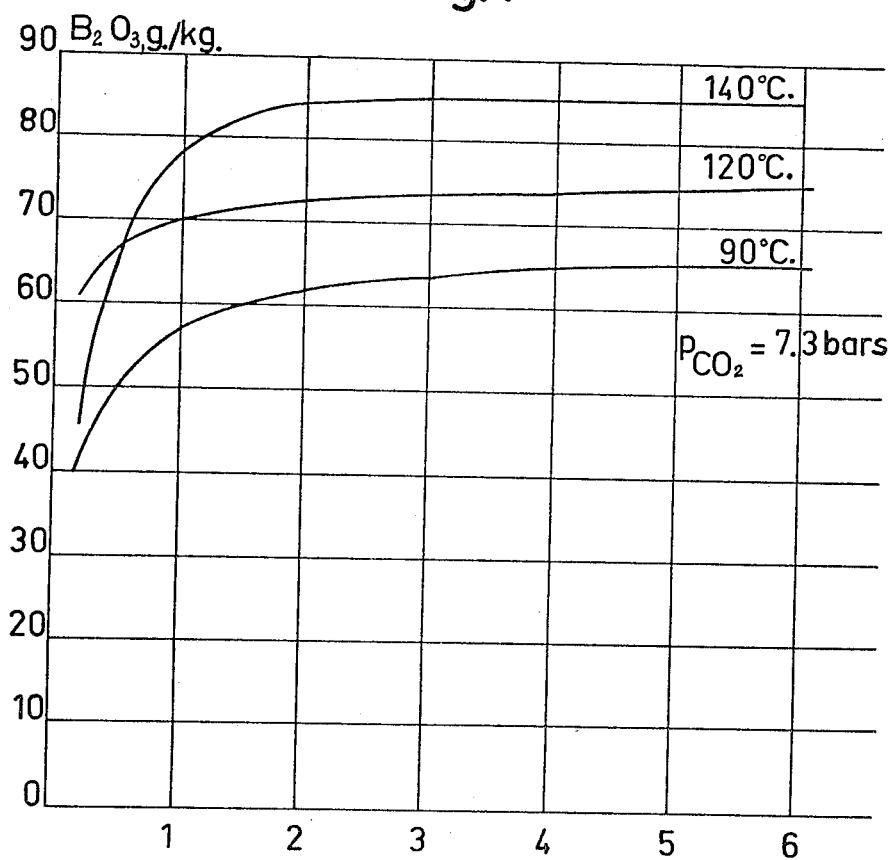
FIG. 1 is a diagram which shows the variation of concentration of $B_2O_3$ in solution obtained after varying periods of reaction of $CO_2$ with an excess of crude colemanite in aqueous suspension at temperatures of 90° C., 120° C. and 140° C., respectively.

The concentrations of $B_2O_3$ recorded in Table 1 were measured after the colemanite had been treated with $CO_2$ for at least 2 hours. After this period of treatment, the concentration of the solution was found to remain substantially constant. This is shown in the diagram of FIG. 1 wherein the period of treatment in hours, as the abscissa has been plotted against the concentration of $B_2O_3$ in g./kg. as the ordinate, for reactions at temperatures 90° C., 120° C. and 140° C. under a partial pressure of $CO_2$ of 7.3 bars.

Identical tests were carried out with an excess of calcined colemanite in aqueous suspension; the results are recorded in Table 2 as a function of the temperature under a constant pressure of $CO_2$ equal to 7.3 bars.

TABLE 2

| Temperatures in °C. | 50 | 90 | 120 | 140 |
|---|---|---|---|---|
| Concentration of $B_2O_3$ in g./kg. in the final solution | 80 | 100 | 108 | 112 |

In principle, a partial pressure of $CO_2$ below 1 bar may be used if the temperature is sufficiently elevated. Nevertheless, from a practical point of view it is preferred to maintain a partial pressure of $CO_2$ equal to at least 1 bar so that higher water vapor pressures are avoided. High water pressure is generally undesirable due to the resultant equipment problems, i.e. the equipment must be built to withstand considerably higher pressures if $CO_2$ partial pressures substantially less than 1 bar are used.

Every other condition remaining identical, when the temperature of treatment is raised and each of the final solutions is separated under conditions of temperature and pressure at least equal to those of the treatment, a decrease in the amount of CaO dissolved in the final solution is found.

Thus, reaction with $CO_2$ has been carried out respectively on crude colemanite under $p_{CO_2} = 6$ bars and calcined colemanite under $p_{CO_2} = 7.3$ bars. The amount of ore has been calculated in order to achieve a concentration of 65 g. of $B_2O_3$ per kg. of final solution. The concentrations at different temperatures of treatment are recorded in Table 3.

TABLE 3

| Temperatures of Treatment °C. | 50 | 90 | 120 | 140 | 160 |
|---|---|---|---|---|---|
| Crude colemanite: Concentration of CaO g./kg. | | 2.5 | 1.8 | 1.45 | 1.1 |
| Calcinated colemanite: Concentration of CaO g./kg. | 6.3 | 3.0 | 2.0 | 1.6 | |

It has been found in particular that when calcined colemanite is treated at 50° C., (the temperature recommended in U.S. Pat. No. 1,108,129 of A. Burger), the amount of dissolved CaO reaches 6.3 g./kg., i.e., more than twice as much as that of a reaction carried out at 90° C.

It is important that the final solution be separated under conditions of temperature and pressure which are at least equal to those of the reaction with $CO_2$. Indeed, if the pressure is decreased before separation, the concentration of dissolved CaO increases considerably as shown in Table 4.

TABLE 4

| | | Composition of the recovered clear liquor | | | |
|---|---|---|---|---|---|
| | | Decantation under the pressure of the reactor | | Decantation after decreasing the pressure to 1 atmosphere | |
| Temperature. °C. | Absolute total pressure. bars | $B_2O_3$ g./kg. | CaO g./kg. | $B_2O_3$ g./kg. | CaO g./kg. |
| 120 | 8 | 70.3 | 2.4 | 71.6 | 6.0 |
| 120 | 9.5 | 80.9 | 2.3 | 81.9 | 5.2 |

Excess of crude Colemanite

All the ores of the borocalcite type may be used according to the invention such as, for example, colemanite, ulexite, pandermite, boronatrocalcite and boracite.

Advantageously, it is preferred that the recovered final solution contain at least 60 g. of $B_2O_3$ per kg. in order that a sufficient, and industrially practical yield of $H_3BO_3$ is obtained during the subsequent crystallization. Industrially, crystallization is carried out at about 25° C., at which temperature the solubility of $H_3BO_3$ is about 30–40 g. $B_2O_3$/kg. If the solution contains at least 60 g. $B_2O_3$/kg., the yield from crystallization is at least 33 percent. This concentration, i.e., 60 g./kg. is about the limit above which the mother liquors from the crystallization of $H_3BO_3$ can be recycled to the treatment stage without the ratio of the amount of treated solution to the amount of recovered boric acid becoming too high.

Figure 2:
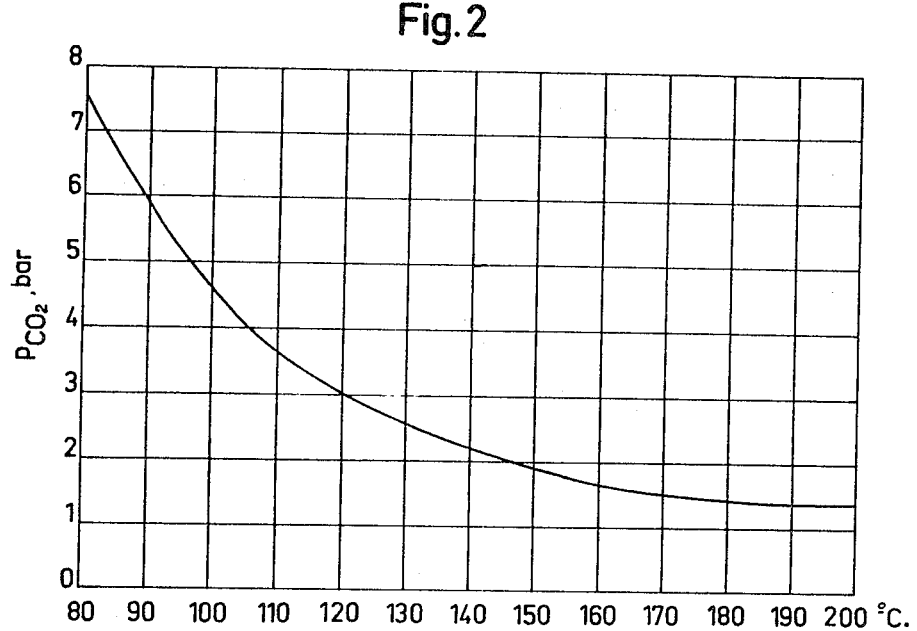
FIG. 2 is a diagram showing the partial pressure of $CO_2$ at varying temperatures of reaction with at least stoichiometric amounts of crude colemanite in an aqueous suspension wherein final solutions are provided which contain at least 60 g. of $B_2O_3$/kg.

When crude colemanite is used as the starting material, final solutions containing at least 60 g. of $B_2O_3$ per kg. are obtained when the temperature is comprised between 80° and 200° C. and when the partial pressure of $CO_2$ is such that a point representing the operative conditions on the diagram of FIG. 2 is always above the curve. On the diagram of FIG. 2, the temperature in ° C. is plotted on the abscissa and the pressure in bars on the ordinate for reaction of at least a stoichiometric amount of crude colemanite in aqueous suspension with $CO_2$ to provide final solutions which contain at least 60 g. of $B_2O_3$/kg.

When calcined colemanite is used as the starting material, the same result is obtained when the temperature is maintained between 80° and 200° C. and when the partial pressure of $CO_2$ is at least 2 bars.

In both cases, it is preferred to operate at a temperature under 200° C. in order to limit the water vapor pressure.

Starting from crude colemanite, boric acid can be easily crystallized from the recovered solution without neutralizing the dissolved CaO which it contains, when the conditions of the diagram of FIG. 2 are respected.

Figure 3:
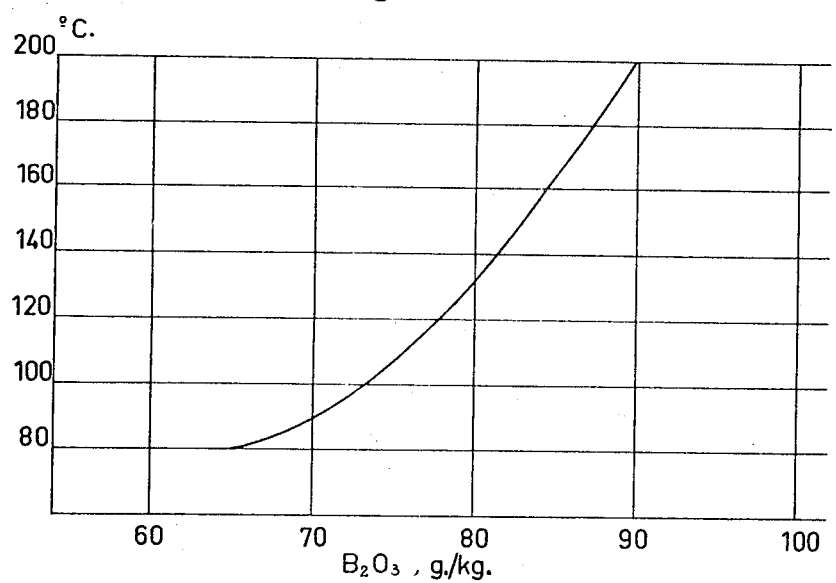
FIG. 3 is a diagram which shows for final solutions containing varying amounts of $B_2O_3$, the minimum temperatures at which reaction of colemanite stoichiometric amounts of calcined with $CO_2$ under a pressure of at least 2 bars must be carried out to prevent precipitation of calcium borate.

Starting from calcined colemanite, the same result is achieved when 1. the amount of ore is calculated so that no ore remains after the treatment, and
2. if the point on the diagram of FIG. 3 corresponding to the temperature of treatment and the content of $B_2O_3$ of the solution at the end of the treatment is above the curve; on diagram 3, the temperature in ° C. is the ordinate and the final content of $B_2O_3$ in g./kg. is the abscissa. When these conditions are not observed, there is a coprecipitation of calcium borates.

It has been found that above 120° C., the precipitation of calcium borates from the recovered solutions in unlikely since their solubilities are high. But, at about 100° C. the rate of precipitation of calcium borates is high. Below 60° C., these borates precipitate very slowly.

For this reason, to separate the boric acid from aqueous solutions obtained according to the invention, it is preferred to cool the solution rapidly to a temperature below 60° C.. Generally crystallization is carried out at about 25° C. for economic reasons, however, this can be done for instance, by flashing under vacuum.

The treatment can be carried out in one or more autoclaves continuously as well as discontinuously.

It has been found that the granulometry of the ore does not affect the concentration of $B_2O_3$ and CaO in the final solution. Thus, the temperature of crystallization is not critical and any convenient temperature below 60° C. may be chosen. At constant $P_{CO_2}$ and temperature, using ore which has been granulated to dimensions below 0.125 mm., between 0.160 and 0.250 mm. and below 2 cm., in each case, the same concentrations of $B_2O_3$ and CaO are obtained. However, the granulometry influences the rate of reaction; finely ground ore reacts faster. Satisfactory rates of reaction are obtained with ore which has been ground to a particular size below about 1 mm.

While the tests described above have been carried out with an excess of colemanite, colemanite in any stoichiometric quantity or less which yields a $B_2O_3$ solution of the desired concentration may be used. The excess of colemanite, whether crude or calcined, has no influence on the desired maximum concentration of $B_2O_3$ in solution, which is a function of the temperature and $CO_2$ pressure in the reactor.

The amount of water employed per kg. of ore is determined from the desired concentration of $B_2O_3$ in the solution and from the content of $B_2O_3$ in the ore. Usually, the colemanite in present use contains 41.5 to 46.5 percent by weight of $B_2O_3$ and the calcium borate in this ore has the formula $2CaO.3B_2O_3.5H_2O$.

In order to take the water of crystallization ($5H_2O$) into account:

1 g. $B_2O_3$ in the ore $\leftrightarrows$ 1.43 g. ($B_2O_3$ + water of crystallization) in the solution Thus, if a solution containing 60 g. $B_2O_3$/kg. is desired, the ratio (w/w) which may be used in the reactor is the following one:

$$\frac{\text{Water}}{B_2O_3 \text{ in the crude ore}} = 15.2$$

For a colemanite containing 46 percent (w/w) of $B_2O_3$ the final ratio is:

$$\frac{\text{Water}}{\text{Colemanite}} = 15.2 \times 0.46 = 7$$

which corresponds to the stoichiometric amount of colemanite which may be used to obtain 60 g. $B_2O_3$/kg. solution.

An excess of colemanite of 100 percent may be used, 1 to 20 percent excess is preferred.

When crude colemanite is employed, the rates of reaction are lower than with calcined colemanite. It can be advantageous to carry out the treatment in two stages.

The following examples further illustrate the best mode currently contemplated for carrying out the present process but they must not be construed as limiting the invention in any manner:

EXAMPLE 1

Into a 3 l. autoclave of stainless steel provided with a double envelope for heating with a thermostatic fluid and with an impeller, having 2 vanes inclined at 45°, a breadth of 20 mm. which rotates at 400 r.p.m. are introduced:

2,500 g. of water 439 g. of pulverized crude colemanite, the dimensions of the grains of which are less than 1 mm.; theoretically, the solution would contain 71.1 g. of $B_2O_3$ per kig. if all the $B_2O_3$ were dissolved;

$CO_2$, the pressure of which in the autoclave is controlled by a monometer coupled to an expansion valve.

The pressure of $CO_2$ chosen is 7.3 atm. and the temperature is 140° C.

Several samplings of clear liquor are made under pressure during the treatment by means of a pipe plunging into the autoclave. The following concentrations are determined after several periods of time:

TABLE 5

| Time | ½ hr. | 1 hr. | 2 hr. | 4 hr. |
|---|---|---|---|---|
| Concentration | | | | |
| $B_2O_3$ g./kg. | 61.8 | 65.6 | 68.5 | 70.3 |
| CaO g./kg. | 1.26 | 1.50 | 1.67 | 1.85 |
| Solubilization of $B_2O_3$ % | 86.9 | 92.3 | 96.4 | 98.9 |

When the reaction is completed the agitation in the reactor was stopped in order to separate the solid and liquid phases by decantation. After 1 hour, the solution is drawn off and rapidly cooled by a refrigerant to about 90° C.

The recovered final solution is concentrated enough to enable the separation of boric acid by crystallization normally. Moreover, the concentration of CaO being low, any chance of precipitating calcium borates is avoided provided the crystallization is carried out with certain precautions as mentioned above; i.e., $H_3BO_3$ is crystallized by further rapid cooling to about 25° C. In this way 144.5 g. of crystallized $H_3BO_3$ is obtained.

EXAMPLE 2

Figure 4:
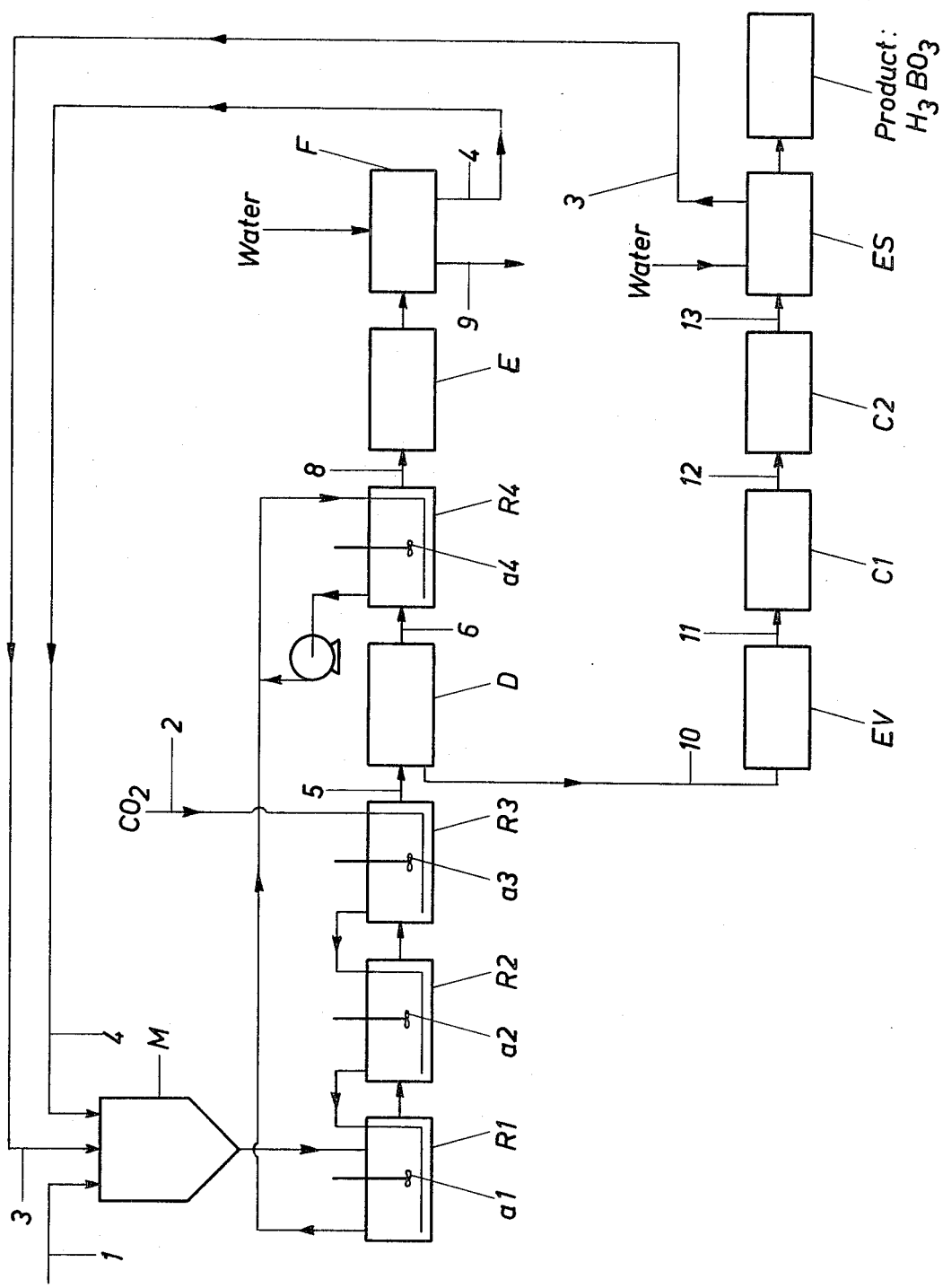
FIG. 4 is a schematic representation of a two-stage process of the present invention.

The process was carried out in two stages and will be described with reference to FIG. 4.

In the mixer M of 25 l. were introduced:

8.34 kg./h. of colemanite (440 g. $B_2O_3$/kg., 236 g. CaO/kg.) via the inlet 1 at a temperature of 20° C.

82.8 kg./h. of an aqueous solution comprising the mother liquor of the crystallization of boric acid obtained in the drying-machine ES. This solution enters the mixer M by way of conduit 3 and it contains 42.2 g. $B_2O_3$/kg. and 2.62 g. CaO/kg.

32.7 kg./h. of an aqueous solution obtained in the filter F where the residues of the ore are separated. This solution contains 55.1 g. $B_2O_3$/kg. and 0.8 g. CaO/kg. and enters the mixer M by way of conduit 4.

From the mixer M, the suspension of colemanite is sent to the reactor R1.

The four reactors R1, R2, R3, R4 each of 100 l. are maintained under a $CO_2$ pressure of 11 bars. $CO_2$ is introduced to the reactor R3 at a rate of 1.52 kg./h. via inlet 2. Means for agitation a1, . . . a4, are provided in these reactors. The temperature in each of the reactors is maintained at 140° C.

After reactor R3, the liquid phase of the reaction medium contains 65 g. $B_2O_3$/kg. and the suspension consisting of this liquid phase and of the residual solid phase of the ore is introduced by means of conduit 5 to the decanting tank D at a rate of 124.8 kg./h. at 11 bars and 140° C. The decanting tank D is maintained under conditions substantially the same as those of the reactors, except that no agitation means are provided within.

From decanter D, two parts are obtained:

1. By way of conduit 10, 107.4 kg./h. of a liquid phase containing 65g. $B_2O_3$/kg. and 2 g. CaO/kg. which is introduced at 140° C. to the evaporator EV.; after that, via conduit 11, 88.3 kg./h. of a solution with 79 g. of $B_2O_3$/kg. is introduced at 65° C. to the crystallizer C1, the temperature of which is 40° C. and volume 20 l. From the crystallizer C1, 88.3 kg./h. of a mixture of crystallized $H_3BO_3$ solution is conducted via conduit 12 to the crystallizer C2 of 20 l. maintained at 25° C.; this mixture contains some crystallized $H_3BO_3$ and a first mother liquor containing 57.5 g. of $B_2O_3$/kg.; this mixture is then sent to the crystallizer C2 maintained at 25° C.; a second mixture escapes via conduit 13 from crystallizer C2, at the same rate of 88.3 kg./h. and it contains the total amount of crystallized $H_3BO_3$ and the final mother liquor which contains 42.5 g. $B_2O_3$/kg. This mixture is washed and separated at 25° C. in the drying-machine ES from which are obtained:

6.5 kg./h. of $H_3BO_3$ containing 536 g. of $B_2O_3$/kg., 82.8 kg./h. of a solution comprising the mother liquor and the washing water which is returned via conduit 3 to the mixer M.

2. By way of conduit 6, the residual suspension of ore enters the reactor R4 maintained at 140° C. under a pressure of 11 bars in which the treatment of the ore is carried out. The reactor R4 receives 17.4 kg./h. of this suspension, in which the liquid phase also contains 65 g. of $B_2O_3$/kg. and 2 g. of CaO/kg. From the reactor R4 is obtained, via conduit 8, 41.1 kg./h. of a suspension in which the liquid phase contains 55.1 g. of $B_2O_3$/kg. and 0.7 g. of CaO/kg. The suspension is sent to the exchanger E and then to the filter F from which is obtained :

8.3 kg./h. of the residue of the ore (via conduit 9) which essentially comprises $CaCO_3$, and 32.7 kg./h. of a solution containing 55.1 g. of $B_2O_3$/kg. which is returned in the mixer M.

Thus the amount of $B_2O_3$ finally obtained in the form of boric acid represents 95 percent of the weight of $B_2O_3$ introduced in the form of colemanite, without any risk of the precipitation of calcium borate.

While the present process has been illustrated by the foregoing specific example, it is evident that many modifications can be made therein without departing from the scope of the invention. For example, borocalcic ores in general can be treated by the present process including ore having a considerable lower $B_2O_3$ content than that of the specific colemanite referred to herein, and the pressure of $CO_2$ used in the process can be substantially lower or higher than that illustrated.

What I claim as new and desire to secure by Letters Patent is:

1. Process for the manufacture of boric acid by crystallization from aqueous solutions obtained by treating borocalcic ore with $CO_2$ in the presence of water which comprises agitating an aqueous dispersion of finely ground crude borocalcic ore under a partial pressure of $CO_2$ of at least 1 bar at a temperature of about 80°–200° C., and in which the pressure of $CO_2$ is such that the point corresponding to the pressure of $CO_2$ at the temperature of treatment is above the curve drawn on the diagram of FIG. 2, separating the solid phase from the liquid phase under a pressure and a temperature at least equal to the pressure and temperature under which treatment with $CO_2$ is carried out, decreasing the pressure and temperature of said liquid phase, and crystallizing boric acid from said liquid phase.

2. Process according to claim 1 in which an aqueous dispersion of crude colemanite is treated with $CO_2$.

3. A process according to claim 1 in which the proportion of water and ore in said aqueous dispersion is that which yields a concentration of at least 60 parts of $B_2O_3$ per kg. of said liquid phase.

4. Process according to claim 1 in which the borocalcic ore has a particle size of less than 1 mm.

5. Process according to claim 1 in which after the solid phase is separated from the liquid phase, the liquid phase is cooled rapidly to a temperature below 60° C. by flashing under vacuum.

6. Process for the manufacture of boric acid by crystallization from an aqueous solution obtained by treating borocalcic ore with $CO_2$ in the presence of water which comprises agitating an aqueous disperson of finely ground calcined borocalcic ore, the exact amount of ore necessary being employed so that no ore is left after treatment with $CO_2$, maintaining the pressure of $CO_2$ above 2 bars, maintaining the agitated aqueous dispersion at such a temperature that the point corresponding to this temperature and the final concentration of $B_2O_3$ in the solution is above the curve of the diagram of FIG. 3, separating the solid phase from the liquid phase under a pressure and a temperature at least equal to the pressure and temperature under which treatment with $CO_2$ is carried out, decreasing the pressure and temperature of said liquid phase, and crystallizing boric acid from said liquid phase.

7. Process according to claim 6 in which the proportion of water and ore in said aqueous dispersion is that which yields a concentration of at least 60 parts of $B_2O_3$ per kg. of said liquid phase.

8. Process according to claim 6 in which said borocalcic ore is calcined colemanite.

* * * * *